Jan. 21, 1969     A. MÜLLER     3,422,872
TIGHTENING LEVER FOR THE SIDE CHAIN OF AN ANTISKID OR
TIRE PROTECTIVE CHAIN
Filed July 26, 1966

Inventor:
Anton Müller

United States Patent Office 3,422,872
Patented Jan. 21, 1969

3,422,872
TIGHTENING LEVER FOR THE SIDE CHAIN OF AN ANTISKID OR TIRE PROTECTIVE CHAIN
Anton Müller, Unterkochen, Wurttemberg, Germany, assignor to Eisen- und Drahtwerk Erlau AG, Aalen, Wurttemberg, Germany
Filed July 26, 1966, Ser. No. 567,864
Claims priority, application Germany, Feb. 18, 1966, E 31,071
U.S. Cl. 152—217      11 Claims
Int. Cl. B60c 27/10

ABSTRACT OF THE DISCLOSURE

An arrangement for tightening an antiskid chain on a tire in which a tightening strand extends around the radially innermost portion of the skid chain and has chain like links at one end and a lever pivoted to the other end with a recess means for receiving one of the links and pivotable into position to lie along the tightening strand after it has engaged a link and with a clamp for clamping the lever to the tightening strand when the lever is pivoted back along the tightening strand.

---

The present invention relates to a tightening lever for the side chain portion of an antiskid or tire protective chain. In order to permit an easy tightening or post-tightening of the side chain portion of an antiskid or tire protective chain, it is necessary that the side chain portion can be pulled without great resistance through the rings receiving the same and pertaining to the antiskid or tire protective chain. Since the side chain portion, however, of a short link structure cannot be designed as flexible as a cable, the tightening of the side chain portion is frequently rather difficult, especially because the individual links of the side chain portion are located at a right angle with regard to each other so that when the side chain portion is tightened, the rings receiving the same and pertaining to the antiskid or tire protective chain together offer a relatively great resistance.

It is, therefore, an object of the present invention to provide a tightening lever by means of which the tightening portions or lateral chain portions of antiskid or tire protective chains can be safely tightened.

It is another object of this invention to provide a tightening lever which will permit the tightening of the lateral chain portions in a simple manner with a relatively great force.

It is still another object of this invention to provide a tightening lever as set forth above which after tightening the lateral chain portion will assure the tightened condition thereof.

Still another object of this invention consists in the provision of a tightening lever which is simple in construction, can be produced at low cost, and can be employed with different types of chains.

These and other objects and advantages of the invention will appear more clearly from the following specification in connection with the accompanying drawing, in which.

Figure 1:
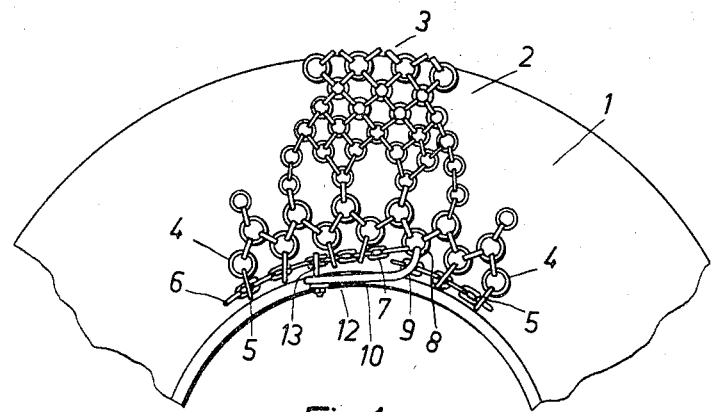
FIG. 1 illustrates a portion of a tire which is provided with an antiskid or tire protective chain.

A tightening lever for the side chain portion of an antiskid or tire protective chain is in conformity with the present invention characterized primarily by a suspension for at least one link of the side chain portion which is arranged in spaced relationship to a linkage point of the tightening lever on the antiskid or tire protective chain. The tightening lever according to the present invention is furthermore characterized by a lever arm which protrudes beyond the linkage point, while in spaced relationship to said linkage point there is provided a connecting member for connection to the tire protective chain. In the suspension member or portion of the tightening lever which is expediently linked to an annular member or ring of the sliding or tire protective chain there may be suspended one end of the lateral chain portion when said tightening lever is in a first position. Then, by tilting the tightening lever, preferably by 180°, into a second position, the lateral chain portion can be tightened. By means of the connecting member, the tightening lever is then locked in its position which corresponds to the position of the tightened lateral chain portion, so that the lateral chain portion will safely be retained in its respective tightened condition. In this way, it is possible with considerable force to tighten the lateral or tightening chain portion of an antiskid or tire protective chain in a quick and simple manner and by means of the lever arm protruding beyond the joint or linkage point. It is also possible instead of linking the tightening lever to a ring member of the antiskid or tire protective chain, to link said tightening lever to the other end of the side chain which forms a portion of the antiskid or tire protective chain. When the tightening lever is directly linked to the antiskid or tire protective chain, the other end of the lateral chain section is advantageously connected to the same ring member as the tightening lever.

According to a further feature of the present invention, the tightening lever has a suspension member in the form of guiding means for the lateral chain portion which guiding means extend in the longitudinal direction of said tightening lever. The lateral chain portion is adapted in the tilting direction of said tightening lever to be positively connected to said guiding means. Due to the guiding means, that end of the lateral chain portion which is positively connected to the tightening lever in tilting direction will be able in response to a tightening of the lateral chain portion to move to the linkage point of the tightening lever so that the lever arm by means of which that end of the lateral chain portion which is to be tightened engages the tightening lever and with increasing tightening force will assure an easy tightening.

A particularly simple construction of the tightening lever is obtained when the guiding means are formed by a recess the width of which is less than the width of the chain links of the lateral chain portions while the width is greater than the thickness of the chain links of the lateral chain portion whereby the recess communicates with an entrance opening for the lateral chain portion. For instance that link which is the last possible link toward the center of the lateral chain portion and belongs to the end to be tightened of the lateral chain portion is introduced into a guiding recess through an opening through which the tightening lever is introduced. Thereupon the already relatively taut lateral chain portion is tightened by turning the tightening lever. During this turning operation of the tightening lever, that link which is located in said guiding recess slides toward the linkage point of the tightening lever.

According to a further devlopment of the invention, the said recess extends close to the linkage point of the tightening lever while the said guiding recess expediently extends over the entire length of the tightening lever so that the total length of the tightening lever is taken advantage of. Due to the fact that the guiding recess extends close to the linkage point of the tightening lever, that portion which is engaged by the tightened end of the lateral chain portion in the tightening position of the tightening lever will be only slightly spaced from the linkage point of the tightening lever so that the latter is subjected only to a slight torque and thus to a low load in operative condition of the chain.

The tightening lever can be produced in a simple manner by designing the journalling recess for the linkage point of the tightening lever and the guiding recess for the lateral chain portion in the form of a single recess.

According to a further development of the present invention, the tightening lever has that end thereof which faces the linkage point angled off so that that end of the lateral chain portion which is located in the guiding recess will in tightened position of said tightening lever extend at a right angle to the angled off portion of the tightening lever and therefore cannot jam.

The opening through which the lateral chain portion is introduced is advantageously formed by a broadening of the guiding recess in that range of the tightening lever which faces away from the linkage point so that the tightening lever will represent a closed structural element which even though it is relatively weakly dimensioned will have a considerable strength.

The tightening lever can be produced at a particularly low cost when it is made of a stock material, for instance round steel, bent to a closed member. By employing round steel, the surfaces of friction which are engaged by the lateral chain portion on the tightening lever are particularly small.

As connecting member there may expediently be employed a shackle extending through the opening of the tightening lever. Upon the leg ends of said shackle there is placed a plate resting on said tightening lever and is held thereon by connecting means, such as nuts. For purposes of fixedly maintaining the tightened position of the tightening lever, any link of the antiskid or tire protective chain, for instance the lateral chain portion thereof, may be grasped by said shackle.

A tightening lever according to the invention is suitable for tightening short as well as long link chains. The tightening lever may, at low cost, be produced in a simple manner in any desired size. Due to the fact that the lever arm which is employed for tightening, and due to the fact that the suspension member of the tightening lever is formed by a structural element, a particularly simple design of the tightening lever is obtained.

Referring now to the drawing in detail, FIG. 1 shows a tire 1 having mounted thereon an antiskid or tire protective chain 2. This chain comprises a running section 3 and lateral sections 4 and has on each side a lateral chain 6 which is guided by means of rings 5 of the lateral sections 4. The said lateral chain 6 is approximately coaxial with regard to the axis of the tire 1. The lateral chain 6 has its one end 7 connected to a ring 8 of the lateral section 4, whereas the other end 9 of lateral chain 6 is connected to a tightening lever 10. Lever 10 is pivotally linked to ring 8 of the lateral section 4 while that end 12 of lever 10 which is remote from the end 12 is held to the lateral chain 6 by means of a shackle 13.

Figure 2:
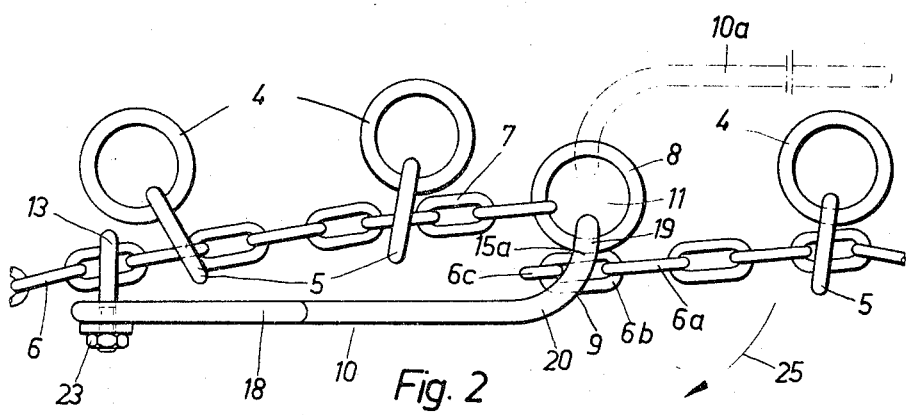
FIG. 2 is a portion of FIG. 1 but on an enlarged scale.
Figure 3:
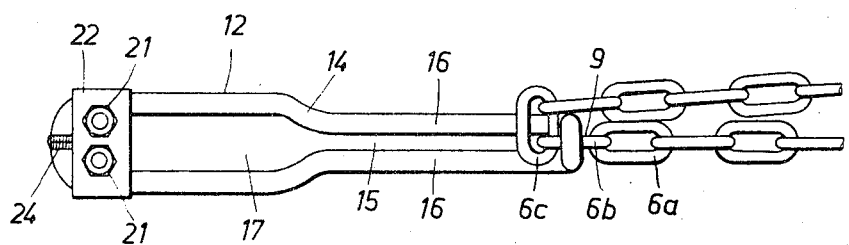
FIG. 3 is a top view of the chain portion shown in FIG. 2.

As will be seen from FIGS. 2 and 3, the tightening lever 10 made of round steel 14 and bent to a closed member is provided with a guiding recess 15 which extends in the longitudinal direction of said lever 10 from its linkage point 11. The said guiding recess 15 is formed by a corresponding spacing of the two legs 16 extending away from the linkage point 11. The guiding recess 15 has a width which is less than the width of the chain links 6a of the lateral chain 6 and is greater than the thickness thereof. As a result thereof, one link each 6b can in its corresponding location be displaced in lying position in the recess 15 of the tightening lever 10 while the two links 6c, 6a in front and behind of said link 6d extend in a transverse direction and cannot be pulled through the guiding recess 15.

Within the range of that end of the tightening lever 10 which is remote from the linkage point 11, the guiding recess 15 widens into an entrance opening 17 which is so wide that the lateral chain with all its links 6a to 6d can be introduced and pulled therethrough. The entrance opening 17 is formed by the legs 16 of lever 10 spreading by a corresponding distance. The guiding recess or gap 15 extends to the linkage point or linkage area 11 of the tightening lever 10 so that the end 15a of the guiding recess 15 which is located in this area serves as a bearing recess surrounding ring 8.

That end 19 which faces the linkage area 11 extends approximately at a right angle with regard to the lever portion 18 of the tightening lever 10. This end 19 merges with the lever portion 18 through a bent portion 20 which follows approximately a quarter of a circle. End 19 has a length which corresponds approximately to the length of a link 6a of the lateral chain 6.

The U-shaped shackle 13 has its legs 21 extend through the entrance opening 17 of the tightening lever 10. The end of the legs 21 has mounted thereon a plate 22 which rests on the legs 16 of lever 10 and is held in its position by nuts 23 threadedly engaging the legs 21 of shackle 13.

According to the tightening position of lever 10 as shown in FIGS. 1 to 3, the lever portion 16 of lever 10 extends away from the tightened end 9 of the lateral chain 6. For purposes of tightening the lateral chain 6, the tightening lever 10 is turned into the position which in FIG. 2 is indicated by dot-dash lines, so that the end 9 of the lateral chain 6 is introduced through the entrance opening 17 of the tightening lever 10, and the member 6b can be moved into the entrance opening 17. Thereupon, the tightening lever 10 is moved from its starting position 10a in the direction of the arrow 25 so that the tightening lever due to its end 12 which is broadened by the entrance opening 17 and forms a handle can easily be grasped by a hand. When turning the tightening lever 10 in the direction of the arrow 25, the link 6b of the lateral chain 6, which link is located in the guiding recess 15, will gradually slide toward the linkage area 11 until it reaches the position illustrated in FIGS. 2 and 3 in the immediate vicinity of the linkage area 11. After turning the tightening lever 10 into its tightening position, the shackle 13 is passed into the entrance opening 17 of lever 10 in such a way that its legs 21 embrace the lateral chain 6 whereby the tightening lever 10 will after connecting the plate 22 be safely held in its tightening position.

The tightening lever 10 of round steel 14 is bent in such a manner that the ends of the round steel 14 are butt welded at 24 at that end which is remote from the linkage area 11.

The length of the entrance opening 17 corresponds to the length of at least two links 6a, 6b; 6c, 6d of the lateral chain 6 so that the shackle 13 can at any rate be so displaced in the entrance opening 17 in the longitudinal direction of the tightening lever 10 that a link 6a of the lateral chain 6 occupying a suitable position can be introduced between the legs 21 of the shackle 13.

What is claimed is:

1. In an anti skid chain for a vehicle tire; a chain portion adapted for fitting about the periphery of the tire while extending radially inwardly along the side of the tire, a flexible tightening element extending circumferentially about the radially innermost part of said chain portion at the side of the tire and including chain-like link means at one end and a lever having its one end swingably connected to the tightening element at the other end thereof, the other end of said lever being free, connecting members connecting the tightening element at spaced points therealong to the radially innermost part of said chain portion so that drawing together of the ends of said tightening element will draw the chain portion against the tire and secure the anti skid chain to the tire, said lever including longitudinal guiding recess means to receive said link means, said recess means being releasably engageable with said link means when the lever is swung about its said one end to a first position in which it extends circumferentially outwardly from said other end of said tightening element and effecting positive sliding engagement with said link means as the lever is swung backwardly toward a second position in which it lies along the said tightening element at said other end of said tightening element, and means for fixedly connecting said lever to said tightening element when said lever is in its said second position.

2. A skid chain according to claim 1 in which said recess means is wider than the thickness of a said link means and narrower than the width of a said link means.

3. A skid chain according to claim 2 in which said recess means includes a region near the free end of said lever wider than the width of a said link means and forming an entrance opening to receive said link means.

4. A skid chain according to claim 1 in which said recess means extends longitudinally in said lever to near the said one end of the lever and said entrance opening is located in the lever near the said other end of the lever.

5. A skid chain according to claim 4 in which said entrance opening forms a continuation of said recess means.

6. A skid chain according to claim 4 in which said lever is curved near the said one end thereof.

7. A skid chain according to claim 5 in which said entrance opening tapers into the end of said recess means which is remote from said one end of said lever.

8. A skid chain according to claim 7 in which said lever is in the form of a length of metal bar stock bent into a closed loop with one end of the loop being narrow to form said recess means and the other end of the loop being wider to form said entrance opening.

9. A skid chain according to claim 1 in which said means for fixing said lever to said tightening element in the second position of the lever is a shackle engaging both the tightening element and the lever and having detachable screw threaded means for closing the shackle.

10. A skid chain according to claim 3 in which said link means at said one end of said tightening element comprises a plurality of interconnected links to form a chain section and said entrance opening is at least as long as two links of said chain section.

11. A skid chain according to claim 1 in which said tightening element is a length of chain and said connecting members are in the form of ring-like members attached to spaced points along the innermost part of said chain portion, said length of chain having its said other end connected to one of said connecting members and running freely through the others of said connecting members.

References Cited

UNITED STATES PATENTS

| | | | |
|---|---|---|---|
| 1,336,369 | 4/1920 | Muffly | 152—231 |
| 1,561,380 | 11/1925 | Van Brunt | 152—228 |

ARTHUR L. LAPOINT, *Primary Examiner.*

CHARLES B. LYON, *Assistant Examiner.*

U.S. Cl. X.R.

254—78